Nov. 12, 1946.    E. WILDHABER    2,410,913
METHOD AND TOOL FOR PRODUCING FACE CLUTCHES
Filed May 8, 1942    8 Sheets-Sheet 1

Inventor
ERNEST WILDHABER

Nov. 12, 1946.   E. WILDHABER   2,410,913
METHOD AND TOOL FOR PRODUCING FACE CLUTCHES
Filed May 8, 1942   8 Sheets-Sheet 2
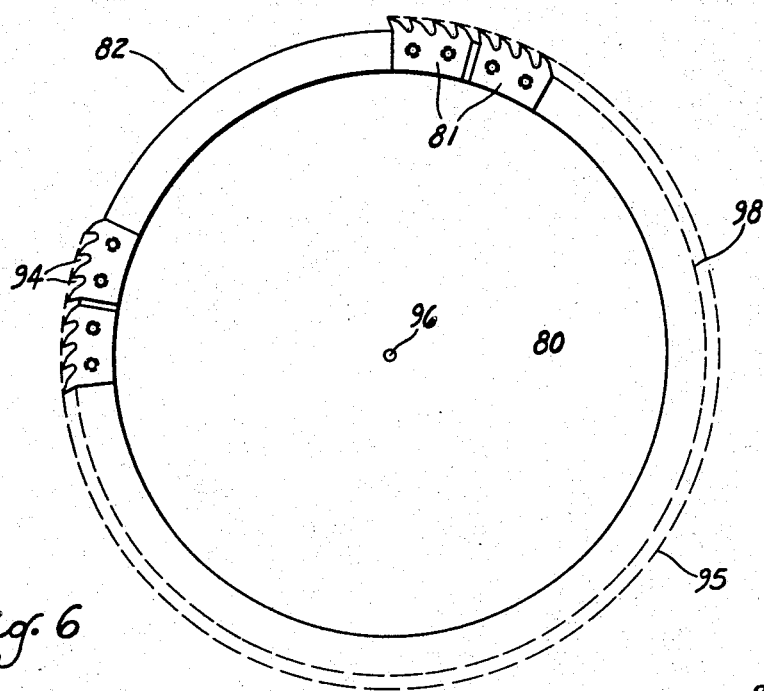
Fig. 6
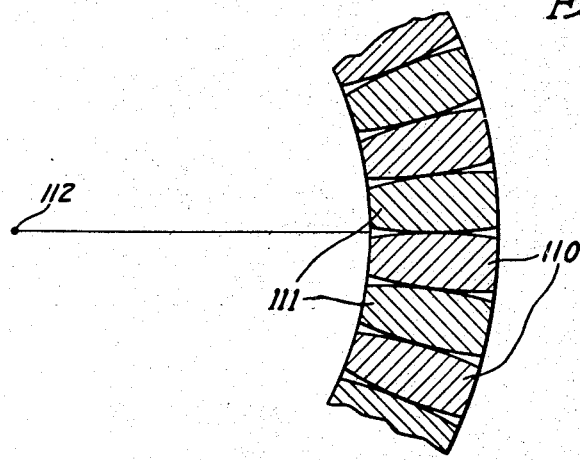
Fig. 9
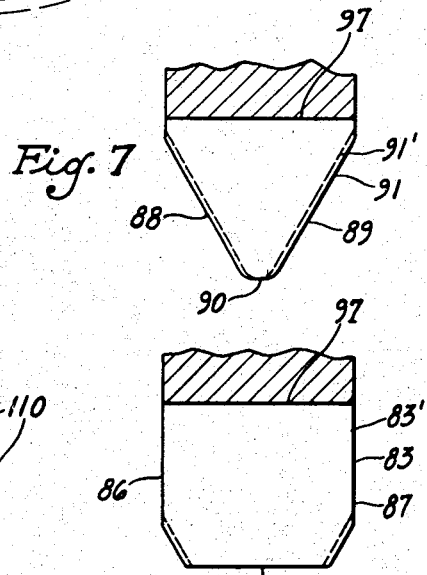
Fig. 7
Fig. 8
Inventor
ERNEST WILDHABER
By
[signature] Schlesinger
Attorney Nov. 12, 1946.　　　　E. WILDHABER　　　　2,410,913
METHOD AND TOOL FOR PRODUCING FACE CLUTCHES
Filed May 8, 1942　　　　8 Sheets-Sheet 3
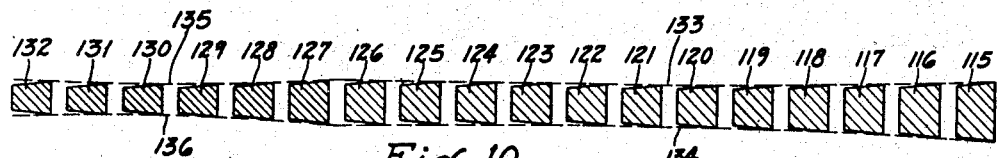
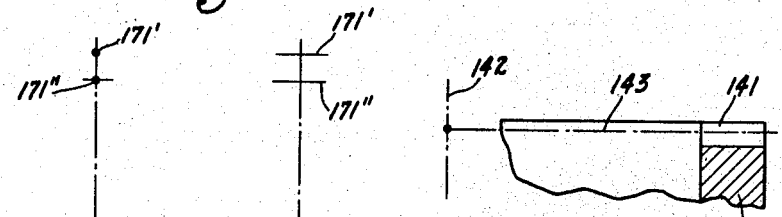
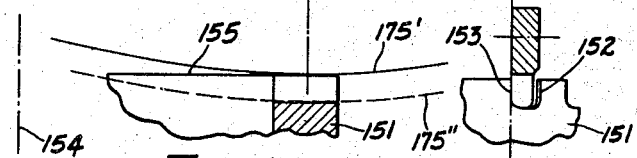
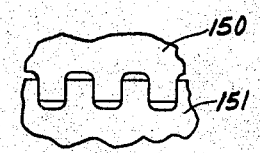
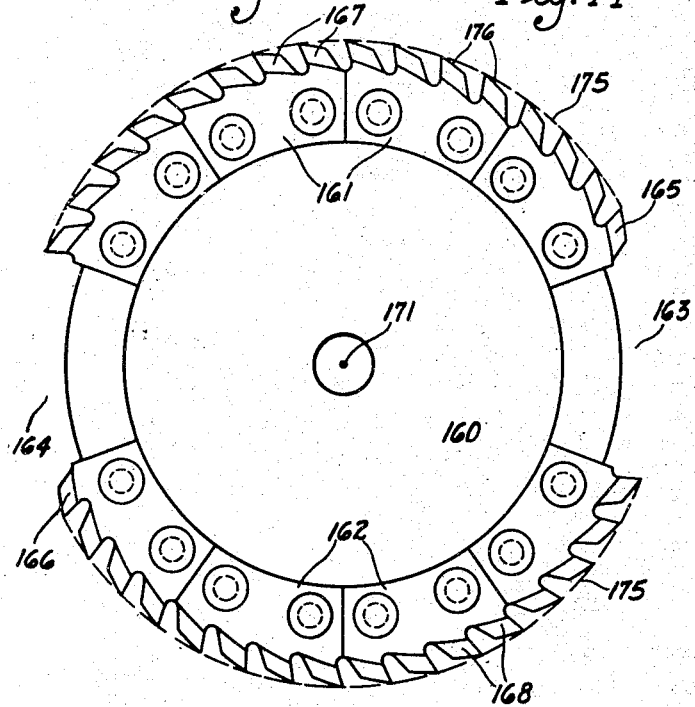
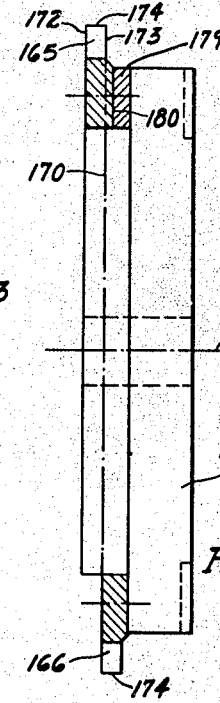
Inventor
ERNEST WILDHABER
By [signature]
Attorney Nov. 12, 1946.        E. WILDHABER        2,410,913
METHOD AND TOOL FOR PRODUCING FACE CLUTCHES
Filed May 8, 1942        8 Sheets-Sheet 4
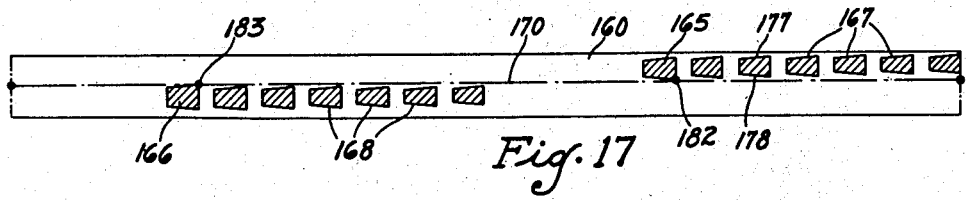
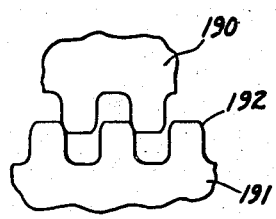
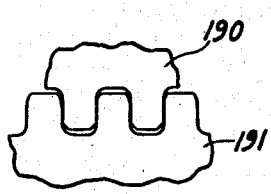
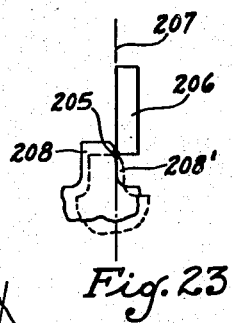
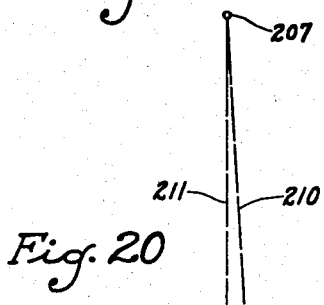
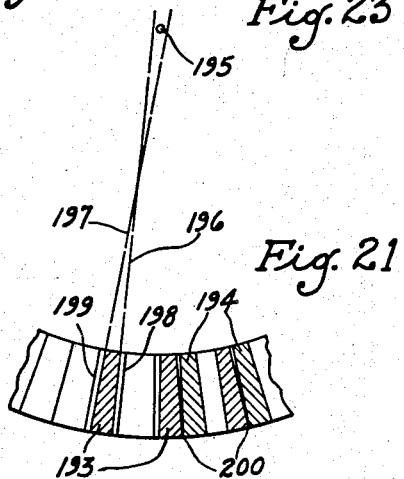
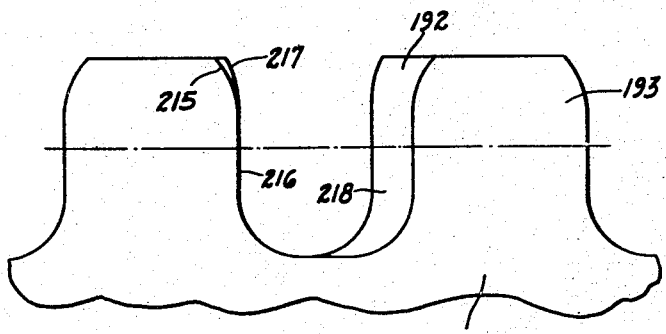
Inventor
ERNEST WILDHABER
By
Attorney Nov. 12, 1946. E. WILDHABER 2,410,913
METHOD AND TOOL FOR PRODUCING FACE CLUTCHES
Filed May 8, 1942 8 Sheets-Sheet 5
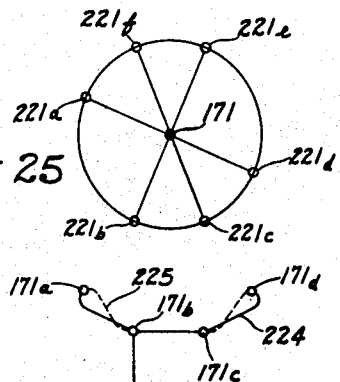
Fig. 25
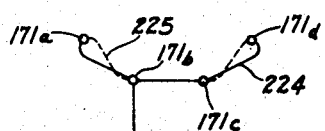
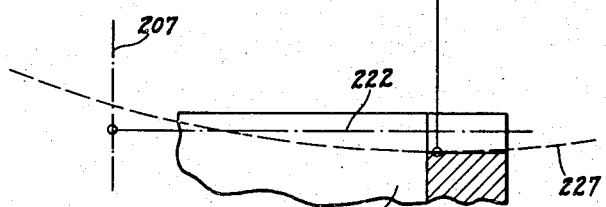
Fig. 24
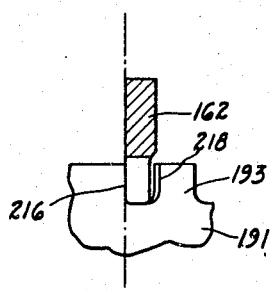
Fig. 26
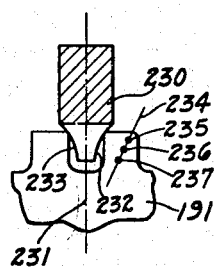
Fig. 27
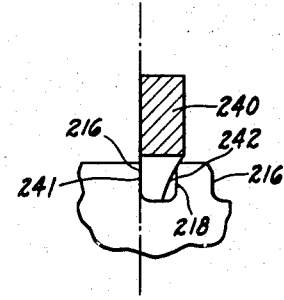
Fig. 28
Inventor
ERNEST WILDHABER
By
Attorney Nov. 12, 1946.  E. WILDHABER  2,410,913
METHOD AND TOOL FOR PRODUCING FACE CLUTCHES
Filed May 8, 1942  8 Sheets-Sheet 6
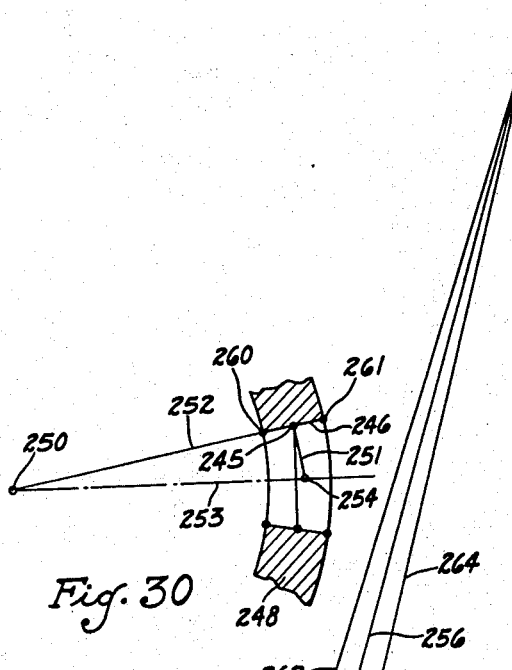
Fig. 30
Fig. 29
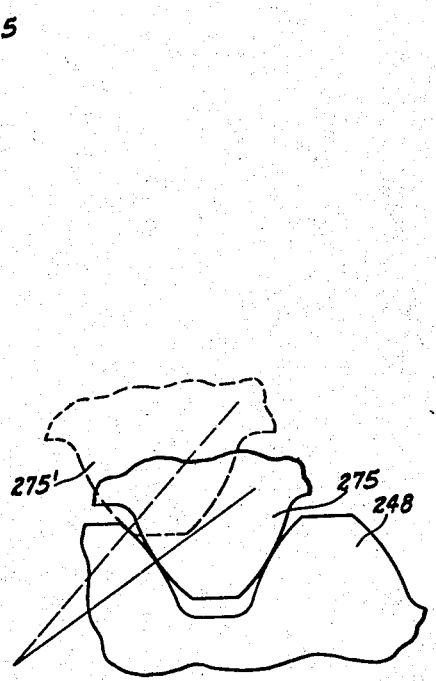
Fig. 33
Fig. 31
Fig. 32
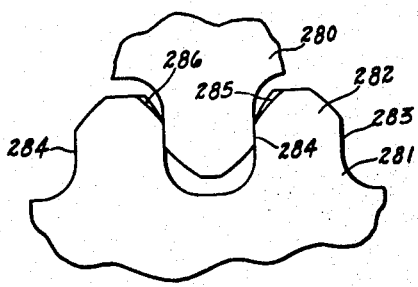
Fig. 34
Inventor
ERNEST WILDHABER
Attorney Nov. 12, 1946.  E. WILDHABER  2,410,913
METHOD AND TOOL FOR PRODUCING FACE CLUTCHES
Filed May 8, 1942  8 Sheets-Sheet 7
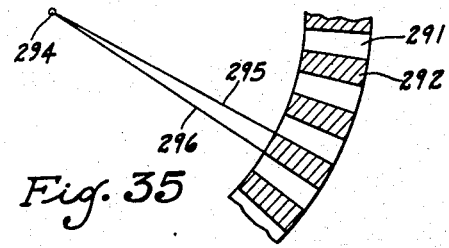
Fig. 35
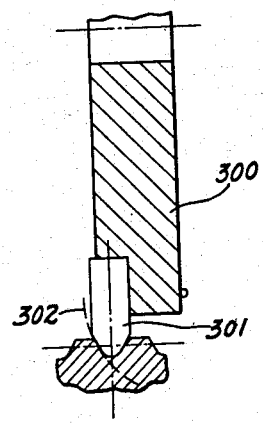
Fig. 37
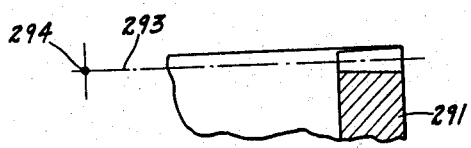
Fig. 36
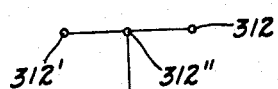
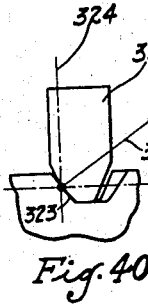
Fig. 40
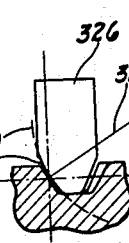
Fig. 41
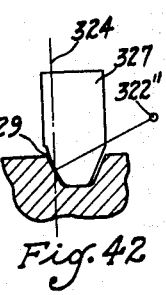
Fig. 42
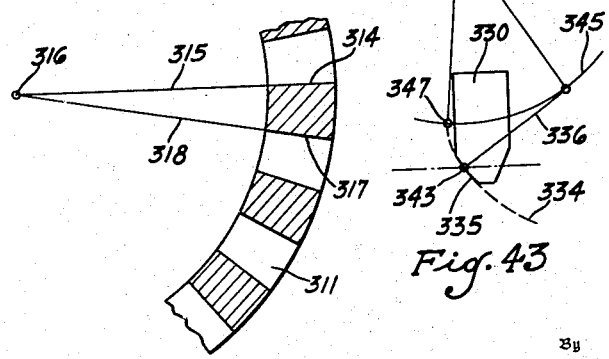
Fig. 38
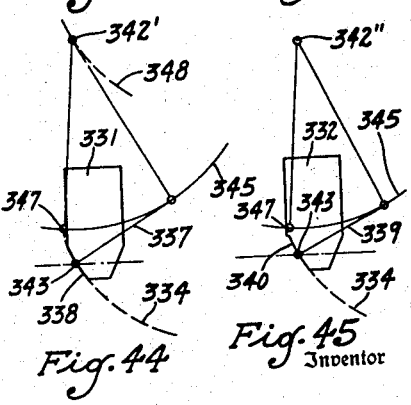
Fig. 43   Fig. 44   Fig. 45
Fig. 39
Inventor
ERNEST WILDHABER
By
Attorney Nov. 12, 1946.  E. WILDHABER  2,410,913
METHOD AND TOOL FOR PRODUCING FACE CLUTCHES
Filed May 8, 1942  8 Sheets-Sheet 8
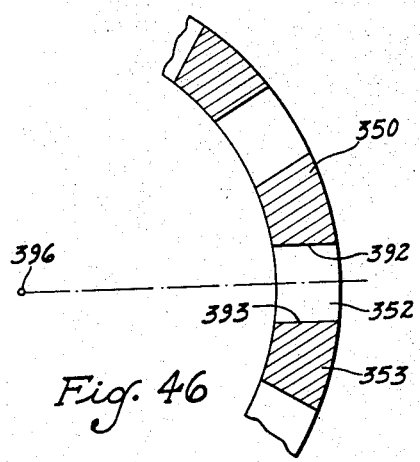
Fig. 46
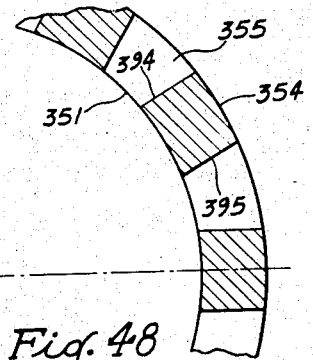
Fig. 48
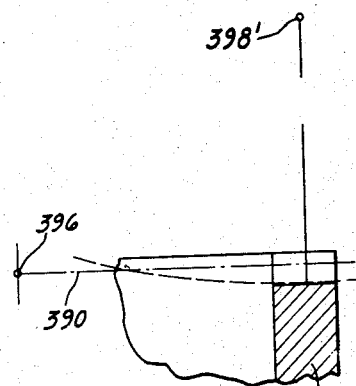
Fig. 47
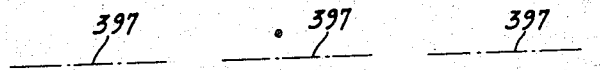
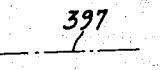
Fig. 49  Fig. 50  Fig. 51
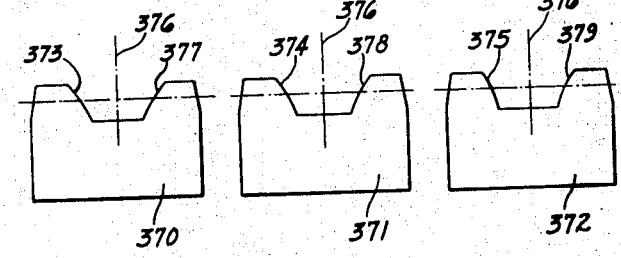
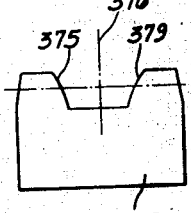
Fig. 52  Fig. 53  Fig. 54
Inventor
ERNEST WILDHABER
By
[signature] Schlesinger
Attorney Patented Nov. 12, 1946

2,410,913

UNITED STATES PATENT OFFICE 2,410,913

METHOD AND TOOL FOR PRODUCING FACE CLUTCHES

Ernest Wildhaber, Brighton, N. Y., assignor to Gleason Works, Rochester, N. Y., a corporation of New York Application May 8, 1942, Serial No. 442,210

31 Claims. (Cl. 90—9)

The present invention relates to face clutches and particularly to those having longitudinally straight teeth, and to methods and tools for producing face clutches.

Face clutches may be classified or divided into four different types, namely, fixed face clutches or couplings, where the two clutch members are rigidly bolted together, axially adjustable face clutches, whose members stay in engagement but are not rigidly held together, releasable face clutches, which are repeatedly engaged and disengaged, and load-releasing face clutches, which are constructed to automatically disengage under excessive loads.

Face clutches can be made with either straight or longitudinally curved teeth. The processes heretofore employed for cutting straight-toothed face clutches have been relatively slow. Face clutch members having longitudinally curved teeth of zero spiral angle can be cut quite rapidly, however. If it is desired to cut both sides of a tooth space of such a clutch member simultaneously, though, it is necessary to adapt the structure of the clutch to the process of cutting. For instance, the taper in depth of the tooth spaces has to be increased, so that the tooth spaces are cut deeper at their outer ends. Particularly is this true of fixed face clutches with longitudinally curved teeth. This is, of course, a disadvantage.

One object of the present invention is to provide a process for cutting the tooth spaces of straight-toothed face clutch members which will be substantially as fast as the methods employed for cutting curved-tooth face clutch members.

A further object of the invention is to provide a process for cutting straight-toothed face-clutch members which will permit cutting two sides of a tooth space of such clutch members simultaneously without requiring any increase in depthwise taper of the tooth spaces.

A further object of the invention is to provide a cutter for and method of cutting straight-toothed face clutch members which will permit of successively roughing and finishing both sides of a tooth space of such clutch members in a single revolution of a cutter.

Releasable face-clutch members ordinarily have the tops of their teeth chamfered to facilitate engagement and disengagement. Another object of this invention is to provide a cutter for and method of cutting releasable face clutch members with proper chamfer at the tops of their teeth.

Still another object of the invention is to provide a cutter for and method of cutting toothed face clutch members whereby one side of a tooth space may be cut and the opposite side chamfered in a single revolution of the cutter.

A still further object of the invention is to provide face clutch members whose teeth are properly chamfered at their tops, so that even when the chamfered portions of the teeth only are in engagement, contact will be made in the middle of the length of the teeth and not be concentrated at the tooth ends.

Other objects of the invention will be apparent hereinafter from the specification and from the recital of the appended claims.

In cutting face clutches according to the present invention, a cutter is employed that is of the disc type. Preferably the cutter has cutting blades arranged part way only around its periphery with one or more gaps between blades. Preferably the cutter is provided with both roughing and finishing blades. A tooth space of the work may be roughed out during depthwise feed of the cutter into the work, and the tooth space may be finished simply by rotating the cutter in engagement with the work after full depth is reached. Alternatively, the roughing operation may be effected during a combined lengthwise and depthwise feed of the cutter in one direction and finishing accomplished during a return lengthwise feed in the opposite direction, after the cutter has reached full depth position.

Where the cutter employed has its blades arranged in two or more groups with a gap between the last and first blades of each group, each group may consist of both roughing and finishing blades. Rough-cutting and finish-cutting of one side of a tooth space may be accomplished with one group of blades during depthwise feed of this type of cutter into the blank. Then the cutter may be withdrawn from engagement with the blank, and the blank indexed half a pitch to bring the opposite side of the tooth space into cutting position. Then the cutter may again be fed into the blank to rough and finish-cut this latter side of the tooth space with the second group of blades, and then the cutter may again be withdrawn from engagement with the blank and the blank may be indexed again through half a pitch to bring one side of a new tooth space of the blank into cutting position.

One feature of the present invention is the provision of novel types of releasable and load-releasing clutches having teeth whose chamfered top portions are helicoidal surfaces of varying lead. With this construction, the inclination of the chamfered portions of the teeth with reference to the clutch axis changes from the inner to the outer ends of the clutch teeth and the clutches will have proper contact even when sliding into or out of engagement.

Like the sides of the teeth, the chamfered portions may be cut with a cutter having cutting blades arranged part way only around its periphery. The chamfer may be cut simultaneously with the cutting of the sides of the clutch teeth by employing a cutter whose blades are so shaped as to cut one side of a tooth space and chamfer the top of the opposite side of the tooth space simultaneously. Such a cutter may have its blades arranged in two groups; one group may cut one side and chamfer the opposite side of a tooth space and the second group may cut and chamfer, respectively, the sides of the tooth space opposite to those operated on by the first group of blades. The work may be indexed through half a pitch between operations of the two groups of cutting blades so that the whole of the tooth space may be cut and chamfered in a single revolution of the cutter.

It is preferred to make fixed face clutches with opposite side tooth surfaces which are inclined to the clutch axis and converge in the clutch axis, but both axially adjustable and releasable face clutches are preferably made with side tooth surfaces that extend in the direction of the clutch axis. For cutting the first named type of clutch, the cutter is provided with finishing blades which are inclined to the cutter axis at other than right angles. For cutting the two last named types of clutches, the cutter is provided with blades whose sides are perpendicular to the cutter axis. Clutches of the load-releasing type are preferably provided with helical side tooth surfaces of constant lead. Such clutches may be cut with cutters having blades of convex profile.

The invention is capable of various other modifications and embodiments as will be described hereinafter.

In the drawings:

Fig. 6 is a plan view of one form of cutter for cutting face clutches of the type disclosed in Figs. 1 to 5 inclusive;

Fig. 7 is a diagrammatic view illustrating the shape of the finishing blades of this cutter;

Fig. 8 is a diagrammatic view, illustrating the shape of the roughing blades of this cutter;

Fig. 9 is a fragmentary sectional view taken in the pitch plane of a clutch of modified form which has teeth so shaped longitudinally that contacting tooth surfaces of the two clutch members engage with less than full lengthwise tooth contact;

Fig. 10 is a developed sectional view showing how the cutter of Figs. 6 to 8 inclusive may be modified to produce clutch members such as shown in Fig. 9;

Fig. 11 is a fragmentary axial sectional view of a still further modified form of fixed face clutch;

Fig. 12 is a fragmentary elevational view showing a pair of axially adjustable face clutch members made according to this invention in engagement;

Fig. 13 is a fragmentary axial sectional view of one of the clutch members and illustrating diagrammatically one method of cutting the same;

Fig. 14 is a fragmentary elevational view further illustrating the preferred method of cutting this clutch member and showing in operation one blade of a cutter, such as may be employed for cutting this clutch member;

Fig. 15 is a plan view and Fig. 16 an axial sectional view of a preferred form of cutter for cutting this type of clutch member;

Fig. 17 is a developed sectional view of this cutter;

Fig. 18 is a fragmentary view showing a pair of releasable clutch members made according to this invention about to be engaged with one another;

Fig. 19 is a corresponding view showing the two clutch members in engagement;

Fig. 20 is a fragmentary sectional view taken through the chamfered portions of the teeth of one of these clutch members and in a plane perpendicular to the clutch axis;

Fig. 21 is a corresponding view, showing, for the purposes of comparison, the structure of a pair of clutch members chamfered by simply rounding off the tops of the teeth;

Fig. 22 is an enlarged elevational view of a releasable clutch member made according to this invention;

Fig. 23 is a fragmentary diagrammatic view illustrating how the chamfer on the teeth of an adjustable clutch member might be produced according to the present invention;

Fig. 24 is a diagrammatic view illustrating one method of cutting the sides of the teeth of a releasable clutch member according to the present invention;

Fig. 25 is a diagrammatic view illustrating the timed relation between the rotation of the cutter and the lengthwise feed of the cutter across the face of the blank in the method of Fig. 24;

Fig. 26 is a fragmentary view showing a blade of a cutter made according to one embodiment of this invention for cutting the side surfaces of the teeth of a releasable clutch member, and illustrating the side-cutting operation;

Fig. 27 is a corresponding view showing a blade of a cutter for chamfering the teeth of such a clutch member, and illustrating the chamfering operation;

Fig. 28 is a corresponding view showing a blade of a cutter which simultaneously cuts one side and chamfers the opposite side of a tooth space of such a clutch member, and illustrating the method of its operation;

Fig. 29 is a diagrammatic view, illustrating one method of cutting a load-releasing clutch member according to this invention;

Fig. 30 is a fragmentary sectional view of a clutch member of this type taken in a plane perpendicular to the clutch axis;

Fig. 31 is a fragmentary elevational view of such a clutch member;

Fig. 32 is a diagrammatic view showing how the theoretically required profile shape of such a clutch member may be approximated by a circular arc;

Fig. 33 is a fragmentary elevational view illustrating diagrammatically the action of a load-releasing clutch constructed according to the present invention;

Fig. 34 is an elevational view of a releasable clutch constructed according to this invention;

Fig. 35 is a section in a plane perpendicular to the clutch axis and Fig. 36 is a section in an axial plane of a load-releasing clutch member constructed according to a still further embodiment of this invention;

Fig. 37 is a diagrammatic view, illustrating one method of cutting this clutch member;

Figs. 38 and 39 are views corresponding to Figs. 36 and 35, respectively, and illustrating a further method of cutting load-releasing clutch members according to this invention;

Figs. 40, 41 and 42 are diagrammatic views further illustrating the method of cutting load-releasing face clutches according to this invention and showing, respectively, the shapes of the cutter blades which cut at the large end, center, and small end of the tooth spaces of the clutch in this method;

Figs. 43, 44 and 45 are corresponding views showing the shapes of the blades of a modified form of cutter;

Fig. 46 is a sectional view in a plane perpendicular to the axis and Fig. 47 is a fragmentary sectional view in an axial plane of one member of a load-releasing type clutch constructed according to a further modification of this invention;

Fig. 48 is a sectional view in a plane perpendicular to the axis of the mating load-releasing clutch member;

Figs. 49, 50 and 51 are views of the blades, which are adapted to operate at the outer end, center, and inner end of a tooth space, respectively, in a cutter constructed to cut a clutch member such as shown in Fig. 46; and Figs. 52, 53 and 54 are corresponding views of the blades of a cutter suitable for cutting the mating member of this clutch.

Figure 1:
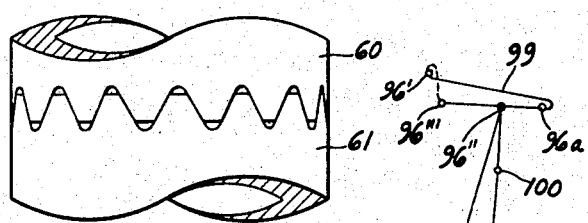
Fig. 1 is an elevational view showing in engagement two members of a fixed face clutch made according to this invention.
Figure 2:
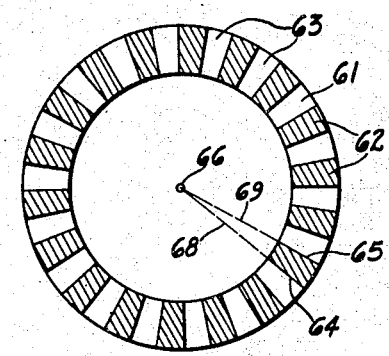
Fig. 2 is a sectional view of one of the clutch members, the section being taken in a mean plane, hereinafter referred to as the pitch plane, which is perpendicular to the clutch axis and in which the thickness of the teeth of the clutch member equals the width of its tooth spaces.
Figure 3:
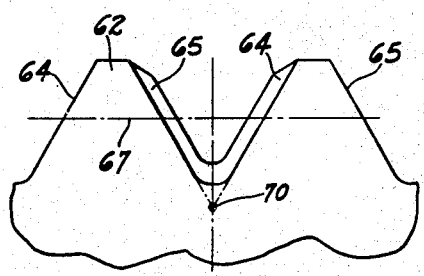
Fig. 3 is a fragmentary elevational view on an enlarged scale of one of the clutch members.

Reference will be had first to the fixed face clutch whose structure is illustrated in Figs. 1 to 5 inclusive. The two members 60 and 61 of this clutch are preferably made identical with one another, and in the interest of brevity, therefore, the structure of only one member, the member 61, will be described in detail. It has straight radial teeth 62 and tooth spaces 63. Its teeth 62 and tooth spaces 63 taper in width and height from their outer to their inner ends. The opposite sides 64 and 65 of its teeth are planes which converge towards the tops of the teeth and intersect in the clutch axis 66. Said planes, therefore, intersect the pitch plane 67 of the clutch member, which is the sectional plane of Fig. 2, in radial straight lines 68 and 69 which intersect in the clutch axis 66. The planes of opposite sides of a tooth space, moreover, if extended, intersect in a straight line 70 (Figs. 3 and 5) which lies in the central plane of said tooth space and intersects the axis 66 of the clutch member in the pitch apex 71 of the clutch member. The normal 73 at mean point 74 in a side 64 of a tooth of the clutch member 61 appears, therefore, in Fig. 5 as a line perpendicular to the line 70 and so do all other normals to the plane of said side.

A cutter, such as may be employed in the cutting of the clutch members 60 and 61 according to this invention, is shown in Figs. 6 to 8 inclusive. This cutter 80 is of disc type and has a plurality of cutting segments 81 arranged part-way around its periphery with a gap 82 between the last and first segments. Each of the segments has a plurality of cutting blades or teeth; in the embodiment shown, four.

Preferably the cutter is provided with both roughing and finishing blades. The roughing blades precede the finishing blades in the direction of cutter rotation.

The roughing blades may be of the type shown in Fig. 8. Here a roughing blade, such as might be employed for cutting at the top of a tooth space of the clutch member, is shown in full lines at 83, and a roughing blade, such as would operate somewhat deeper in the tooth space toward the bottom thereof, is shown in dotted lines at 83'. The point-widths of successive roughing blades vary, therefore, in accordance with the position in the tooth space at which the blade is to cut. All the roughing blades have wide top-cutting edges 85 and straight parallel sides 86 and 87 that are perpendicular to the axis 96 of the cutter, and the sides 86 and 87 of these blades are beveled off near their tops where they join the top-cutting edges 85.

The finishing blades of the cutter may be of the type shown in Fig. 7, having opposite side edges 88 and 89 which converge to their tip 90 so that the blades are of general V shape. The point-widths of the finishing blades, like the point-widths of the roughing blades, vary. The finishing blade 91, which is adapted to cut at the outer ends of the tooth spaces of the clutch member, is shown in full lines in Fig. 7 and a finishing blade, which is intended to cut further along the tooth space nearer to the clutch axis, is shown is dotted lines at 91'.

Preferably the roughing and finishing blades are made all of the same height so that the tip-cutting edges of these blades lie in the same cylindrical surface 95 (Fig. 6) concentric of the cutter axis 96. Preferably, also, the gashes 94 between successive blades of the cutter are made of uniform depth so that the bottoms 97 of these gashes will all lie in the same cylindrical surface 98 concentric of the cutter axis 96.

All blades are relieved on their tips back of their tip-cutting edges. In addition, the finishing blades are relieved on their sides back of their side-cutting edges.

Figure 5:
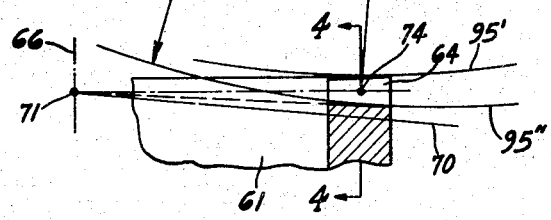
Fig. 5 is a diagrammatic view, showing one of the clutch members fragmentarily in axial section, and illustrating diagrammatically one method of cutting such a clutch member.
Figure 4:
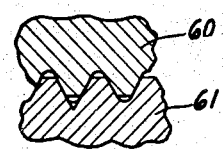
Fig. 4 is a fragmentary sectional view of a pair of the clutch members in engagement, the section being taken on a line corresponding to the line 4—4 of Fig. 5.

In the preferred operation, the cut in the tooth space of a clutch member 61 starts with the axis of the cutter at position 96' (Fig. 5). As the cutter rotates on its axis, it is fed longitudinally of the tooth space and also depthwise into the tooth space so that the axis of the cutter travels along the inclined line 99 (Fig. 5). During this lengthwise and depthwise feed movement, the roughing blades of the rotating cutter come successively into operation and rough out the tooth space. When the cutter has been fed beyond the full length of the tooth space, its direction of lengthwise feed is reversed. The cutter itself, however, continues to rotate on in the same direction. The depthwise feed movement continues, moreover, until the cutter reaches full depth position with its axis at 96a. Then the depthwise feed movement is discontinued. It is preferred, as illustrated, to have the reversal of the lengthwise feed take place before full depth position is reached so that all backlash may be taken up before the finish-cut starts. The reverse lengthwise feed movement continues until the cutter has been fed back across the full length of a tooth space of the clutch member and its axis has reached position 96'''. During this reverse lengthwise feed movement, the finishing blades of the cutter operate and finish-cut the sides of the tooth space. When the finishing cut is completed, the cutter is quickly withdrawn in a depthwise direction, as indicated by the dotted line 96'''—96' and returned to initial position with its axis at 96'. The withdrawal movement occurs while the gap 82 in the cutter is abreast of the blank, and the blank is indexed during the withdrawal movement.

Thus in a revolution of the cutter, a tooth space of the clutch member will be roughed out and finished. The roughing blades of the cutter are wide enough to reach across the full width of the tooth space and leave on just enough stock for the finishing blades to remove in the finishing cut. Hence, the full width of a tooth space is cut at all times, even during the depth feed of the cutter. The roughing blades cut principally with their top cutting edges 85, while the finishing blades cut principally with their side edges 88 and 91. Both the roughing and finish cutting operations are, therefore, very efficient.

The combined rotary motion and feed of the cutter can be considered as a rolling motion whose instantaneous axis is, for instance, at 100 when the axis of the cutter is at position 96'' intermediate the ends of the finishing feed movement. The mean point 74 in the side surface 64 of a tooth is finished when the normal 73 to the side surface of the tooth at this point passes through the instantaneous axis 100.

95' (Fig. 5) denotes the position of the tip cutting surface of the cutter at the beginning of the cutting operation when the axis of the cutter is at 96'. 95'' denotes the position of the tip cutting surface of the cutter when the cutter is in full depth and its axis is at 96'' in the middle of the return finishing feed movement.

It will be understood, of course, that instead of imparting the lengthwise and depthwise feed movements to the cutter, either or both of these motions may be imparted to the work instead, and the cutter simply rotated on its axis.

Preferably fixed face clutches are made so that the contacting teeth will have less than full length engagement or bearing. In this way the ends of the teeth are relieved of pressure. Thus, as illustrated in Fig. 9, each clutch member may be provided with teeth whose sides are longitudinally convex so that the mating tooth sides will engage with localized contact or bearing. Here 110 denotes teeth of one clutch member and 111 denotes the teeth of the other. The axis of the clutch is at 112. Opposite sides of the teeth of both members are longitudinally convex, as shown, so that mating tooth surfaces have a contact which is heaviest at their longitudinal centers and which fades away toward both ends of the teeth.

Such clutch members can readily be produced by gradually increasing, over standard proportions, the point-widths of the roughing blades from the blade which cuts at the center of the tooth length to the blades which cut at the two ends of the tooth space and by gradually widening the point-widths of the finishing blades in a similar manner.

This construction is illustrated in Fig. 10. Here the roughing blades of the cutter are denoted at 115 to 126 inclusive and the finishing blades at 127 to 132 inclusive.

Since the tooth space of the clutch member is widest at its top and has sides which converge to the bottom of the tooth space, and since the roughing operation proceeds with a depthwise as well as a lengthwise feed, and the blade 115 is the first to cut, this blade is the widest of the roughing blades. Ordinarily, the roughing blades would then be progressively narrowed in point-width to the final roughing blade 126 which is intended to cut at full depth at the outer end of a tooth space. The finishing blades cut at full depth, and ordinarily the finishing blade 127, which cuts at the large end of a tooth space, would be the widest of the finishing blades, the finishing blade 132, which cuts at the small end of the tooth spaces, would be the narrowest of the finishing blades; and the point-width of the finishing blades would progressively decrease from the blade 127 to the blade 132.

To produce the longitudinally crowned tooth shape, the point-widths of the blades, which cut at the two ends of the tooth spaces, are increased over standard dimensions, that is, the opposite side edges of the blades are gradually offset from their conventional positions beginning with the blade which is intended to cut midway the length of a tooth space. This offset increases progressively from this middle blade toward the blades which cut at both ends of the tooth space. As a result, the opposite side edges of the roughing blades in the view of Fig. 10 lie in curved lines 133 and 134 and the opposite side-cutting edges of the finishing blades 127 to 132 lie in curved lines 135 and 136.

Fig. 11 shows a modified form of fixed face clutch in which each clutch member 140 has teeth 141 of constant depth from end to end. The sides of the teeth of this clutch member will, however, otherwise be of the same shape as the clutch previously described. If the clutch members are to engage with full length contact, then, the sides of the teeth 141 will be plane and will converge in the clutch axis 142. If the clutch member 140 is to have localized tooth bearing, then these teeth will be of the shape shown in Fig. 9.

The same cutting cycle, as previously described, may be employed in the production of the clutch member 140; the only difference is that the finishing feed stroke will be parallel to the pitch plane 143 of the clutch member rather than inclined thereto as in the instance of the clutch members illustrated in Figs. 1 to 5 inclusive and 9.

The principles of the present invention are not limited to the production of fixed face clutches but, as shown in Figs. 12 to 17 inclusive, may also be applied to face clutches of the axially adjustable type. Here again the tooth sides of the clutches are planes which converge at the clutch axis in the same way as the clutch of Fig. 2. In the embodiment illustrated, however, the sides of the teeth of the axially adjustable clutch extend in the direction of the clutch axis instead of being inclined thereto as is the case with the fixed clutch of Figs. 1 to 5.

A pair of engaging axially adjustable clutch members are shown at 150 and 151 in Fig. 12. The teeth of each clutch member have sides 152 which are, as stated, plane and parallel to the clutch axis 154. Preferably the top surfaces 155 of the teeth are also plane and are perpendicular to the clutch axis 154.

Preferably the two sides of a tooth space of each clutch member are cut successively in a single revolution of a rotary disc cutter. A cutter suitable for this purpose is shown at 160 in Figs. 15 to 17 inclusive. This cutter has its cutting blades arranged in two groups, one group being intended to rough-cut and finish successively one side of a tooth space and the other group being intended to rough-cut and finish successively the opposite side of the tooth space.

The cutter may again be of the segmental type. The cutting segments for cutting one side of a tooth space are denoted at 161 and the cutting segments for cutting the opposite side of a tooth space are denoted at 162. In the form shown, each segment comprises four cutting blades or teeth, and the two groups of segments are separated by peripheral gaps 163 and 164.

In the preferred construction, the final cutting tooth or blade of each group is a finishing blade and all of the preceding blades of the group are roughing blades. The finishing blades of the two groups are denoted at 165 and 166, respectively, (Figs. 15 and 17), while the roughing blades of one group are denoted at 167 and of the other group at 168.

The opposite sides 172 and 173 of each blade are parallel and perpendicular to the axis 171 of the cutter. The tip edges 174 of all of the blades are preferably disposed at the same radial distance from the axis 171 of the cutter so as to lie in a cylindrical surface 175 concentric with the axis of the cutter. The two groups of blades are disposed, respectively, at opposite sides of a plane 170, hereinafter called the cutter plane, that is perpendicular to the axis 171 of the cutter. The roughing blades are intended to cut primarily with their tip cutting edges. The finishing blades 165 and 166, respectively, of the two groups have side-cutting edges, and these edges are offset laterally with reference to the corresponding side edges of the preceding roughing blades of that group.

Preferably the finishing blades are so arranged that their opposite side-cutting edges 182 and 183, respectively, coincide with the plane 170 perpendicular to the cutter axis 171. Thus the roughing edges of the two groups are offset at opposite sides of the plane 170 while the finishing edges of blades 165 and 166 preferably lie in that plane.

In cutting a face clutch with the cutter 160, the cutter is so positioned relative to the work that the cutter plane 170 passes through and contains the clutch axis 154. One side surface 153 of a tooth space of the clutch is then roughed out by feeding the rotating cutter depthwise into the work until the cutter reaches full depth position. In this feed movement, the cutter axis will move from the position 171' (Figs. 13 and 14) to the position 171'', and the outside cutting surface of the cutter will move from position 175' to position 175''. In this depthwise feed movement, the roughing blades 167 of one group of blades of the cutter will cut with their tip cutting edges only, and a slight amount of stock will be left on the side of the tooth space to be removed by the finishing blade.

Fig. 14 is a view showing the cutter at full depth position. After full depth position has been reached, the depthwise feed movement stops, and the finishing cut along the whole length of the tooth surface is taken by the finishing blade or blades 165.

The cutter is then withdrawn to starting position. During this withdrawal movement the gap 163 in the cutter comes abreast of the work and the work is indexed half a pitch. In this way the opposite side 152 of the tooth space is moved into the cutter plane 170. The depthwise feed then starts anew and proceeds in the same manner as before so that the roughing blades 168 of the group 162 rough out the opposite side of the tooth space. After full depth position has been reached, the feed again stops and the finishing blade 166 finishes that side of the tooth space. Then the cutter is withdrawn again from engagement with the work, and the work is again indexed through half a pitch to bring a side 153 of the next tooth space into position to be cut. Thus the operation proceeds until all of the tooth spaces have been completed.

In the operation as described, then, there are two complete depthwise feed cycles per cutter revolution, and the work is indexed twice per cutter revolution, each time through half a pitch. In other words, a clutch having $n$ teeth is indexed through an angle of $360°/2n$ at every half turn of the cutter.

For the purposes of clearer illustration, the number of roughing blades shown in the developed view of Fig. 17 is less than that shown in the cutter of Fig. 15. All of the blades of the cutter 160 are relieved on their sides as well as their tip surfaces back of their front faces to insure good cutting action especially by the finishing blades. The relieved side surfaces are denoted at 177 and 178 (Fig. 17) and the relieved top surfaces at 176 (Fig. 15).

Because of the side relief, the side edges of the blades will be axially displaced each time the blades are sharpened. Axial adjustment of the two groups, 161 and 162, of the blades is required, therefore, after each sharpening of the cutter. The cutter itself can be adjusted bodily to line up the finishing blade 166 of group 162 with the cutting plane 170, and this automatically disposes the roughing blades of that group in the same offset relation to the cutter plane as when the cutter is new. The blades of group 161 can be brought back into the proper relation to the cutting plane 170, after sharpening, by thinning up the spacer or shim 179 which is interposed between the inside surfaces of the segments 161 and the adjacent side face of the head of the cutter 160. Alternatively, the segments 161 themselves can be thinned up by grinding off the inside surfaces 180 after each sharpening. The amount of stock that has to be removed from the shims or from the segments is quite small and can be controlled accurately.

With the cutting method described, the bottoms of the tooth spaces of the clutch members 150 and 151 will be curved, but the curvature of the tooth space bottoms will be hardly visible and certainly no drawback, whereas the cutting process itself is fast and efficient. Furthermore, the finish and accuracy of the sides of the clutch teeth is of a very high order because the principal amount of stock is removed from the tooth spaces in the roughing operation during the depthwise feed, and the finishing blades of the cutter have only to remove the slight amount of stock left after full depth position is reached. Hence the shape and position of the finished side surfaces of the clutch teeth are unaffected by any possible inaccuracies in the depthwise movement.

Face clutches, whose teeth have plane sides extending in the direction of the clutch axis and converging in the clutch axis, can be used conveniently as releasable clutches if the tops of the teeth are suitably chamfered to facilitate engagement and disengagement of the clutch members. The chamfer is required since one or both of the shafts or other parts, to which the clutch members are secured, may be rotating at high speed when the clutch members are being moved into or out of engagement. Since, at the start of their engagement, a sudden and heavy crash load may be exerted on the chamfered ends of the clutch teeth, the chamfer, moreover, should be such as to enable the teeth to bear in their middle or along their whole lengths even when only the chamfered parts of the teeth are in contact.

Fig. 18 shows a pair of releasable clutch members about to be engaged and Fig. 19 shows these same members in fully engaged position. Where the chamfer consists of an ordinary round extending along the sides of the teeth at their tops, as illustrated clearly in Fig. 21, the chamfered portions of the teeth will bear only at their ends when in contact. In Fig. 21, the teeth of one clutch member are denoted at 193; the teeth of the other clutch member at 194. Where the chamfer consists of a round at the tops of the teeth, the chamfered surfaces will be parts of cylindrical surfaces extending lengthwise of the teeth. Planes perpendicular to the clutch axis 195 then intersect the cylindrical chamfer of the opposite sides of the teeth along straight lines 196 and 197, respectively, which are parallel to the plane side surfaces 198 and 199, respectively, of the teeth. Since the plane sides 198 and 199 of the teeth are radial and pass through the clutch axis 195, the lines 196 and 197 will be parallel to said sides and offset at opposite sides of the clutch axis 195, and will cross one another.

Because of this, when the chamfered portions only of the mating clutch elements are in contact, they will contact at the outer ends only of the chamfered portions of their teeth, as denoted at 200 in Fig. 21, and the outer ends of the chamfered portions of the teeth will have to carry the whole of the load when the clutch members are being moved into or out of engagement. This means that the chamfered portions of the clutch members will not be able to carry heavy loads and, as a consequence, that the clutch members themselves will be unable to stand heavy loads.

I have discovered that engagement at the middle of the teeth or also engagement along the whole length of the chamfered surfaces of releasable clutch members can be obtained when the chamfered surfaces are made helicoidal surfaces of varying lead. For clutch members having radial teeth, the helicoidal surfaces giving full length contact should be such that their generatrices are straight lines, which extend longitudinally of the teeth and radially of the clutch axis in any plane through the chamfered surfaces perpendicular to the clutch axis.

In principle, the proposed chamfer may be described or produced by a point 205 (Fig. 23) of a tool 206 which reciprocates radially of the clutch axis 207, while a relative helicoidal movement is produced between the cutting tool and the clutch about the clutch axis. The radial reciprocation of the tool will cause the point of the tool to describe a straight line perpendicular to and intersecting the clutch axis. In the relative helicoidal movement, the work may be turned slowly on its axis and moved in the direction of its axis at a varying rate as compared with its rotary motion as the tool 206 moves across the face of the clutch. This helicoidal movement will cause the clutch to move from the full line position indicated at 208 in Fig. 23 to the dotted line position shown at 208', while the cutting tool is being reciprocated radially of the clutch axis.

When the teeth of a clutch member are chamfered in the described fashion, the elements or generatrices of the helicoidal chamfered surfaces in any plane perpendicular to the clutch axis will extend radially of the clutch axis as do the lines 210 and 211 in Fig. 20. When the teeth of two clutch members are provided with such helicoidal chamfers, they bear along their full length even when they are coming into engagement and the contact is still only on the chamfered portions of the teeth. Thus such clutch members can carry much heavier loads at all times than the conventional type of clutch.

A portion of a clutch member, whose teeth 193 have a helicoidal chamfer, is shown on an enlarged scale in Fig. 22. It will be noted that the inclination of the chamfered portion 192 of the tooth surfaces to the clutch axis increases with increasing radial distance from the clutch axis. Thus the profile curve 215 of the chamfered surface at the outer end of a clutch tooth has a greater inclination to the tooth side 216 than the profile curve 217 at the inner end of the chamfered portion of the tooth. In other words, the profile curve 215 of the chamfered portion at the outer end of the tooth has a smaller radius than the profile curve 217 of the inside of the tooth.

In the embodiment shown in Fig. 22, the chamfered portions of the teeth join the side surfaces of the teeth smoothly without break. The juncture may be at an angle, however, but, if so, this is preferably kept as small as possible.

To produce the desired chamfered surfaces, the cutting tool may be fed either depthwise or longitudinally across the face of the clutch blank. The plane sides of the teeth may be cut by a simple depthwise feed of a tool according to the process described with reference to Figs. 13 and 14. If tooth spaces having straight bottoms are desired, though, a lengthwise feed movement must be produced between cutter and work.

Whether in the cutting of the sides of the teeth pure depthwise feed is employed or a lengthwise feed, it is preferred to employ a cutter of the type shown in Figs. 15 to 17 inclusive, that is, a cutter having two separate groups of blades for cutting, respectively and successively, opposite sides of the teeth. The two plane sides 216 and 218 of a tooth space are then cut, as before, in succession, and the work is indexed half a pitch after each half turn of the cutter.

Fig. 24 illustrates diagrammatically a preferred method of cutting the sides of the tooth spaces in such way as to produce tooth spaces with straight bottoms. The cut may start with the axis of the cutter at 171a. As the cutter rotates on its axis, it is first fed both in the direction of depth and in the direction of the length of the tooth space until the cutter reaches full depth position with its axis at 171b. During this movement, the cutter will have rotated about its axis through an angle 221a—171—221b. After reaching full depth position, the cutter is moved in the direction of the pitch surface 222 of the clutch member until its axis reaches position 171c. During this movement, the cutter will have rotated about its axis through an angle equal to 221b—171—221c. Then the cutter is withdrawn from engagement with the clutch until its axis reaches the position 171d, moving along the dotted line 171c—171d and through an angle 221c—171—221d. During this withdrawal, the gap 163 in the cutter will be abreast of the work and the work will be indexed through half a pitch. The cut is then started on the other side of the tooth space, the cutter being fed depthwise and lengthwise along the full line 224 until the cutter axis again reaches the position 171c, with the cutter at full depth position. Then the cutter is fed along the full length of the tooth space without depth feed until its axis again reaches position 171b. The two sides of the tooth space will then have been completed and the cutter is again withdrawn from engagement with the work so that its axis will travel along the dotted line 225 until it returns to initial position 171a. In this withdrawal, the work is again indexed through half a pitch. This completes the cycle and the cycle begins anew to cut a new tooth space of the work.

During the feed from position 171d to 171c, the cutter will rotate through the angle 221d—171—221e while during the reverse travel at full depth position, the cutter will rotate through the angle 221e—171—221f, and during the final withdrawal, the cutter will rotate through an angle 221f—171—221a The dotted line 227 denotes the position of the tip cutting surface of the cutter when the axis of the cutter is at 171b.

As already stated, the chamfer may be applied to the teeth in an operation separate from the operation of cutting the tooth sides. Both sides of a tooth space may be chamfered simultaneously with a rotary cutting tool having blades 230 (Fig. 27) whose opposite side edges 232 and 233 are of concave curved profile, preferably circular arcs. Successive blades of this cutter may have their corresponding side cutting edges differently inclined to a plane 231 perpendicular to the axis of the cutter so as to produce a close approximation of the desired helicoidal chamfer surface. Thus, the centers of curvature of the corresponding sides of successive blades of the cutter may be displaced axially and radially of the cutter in a direction inclined to the plane 231 in accordance with the inclination of a tangent to the helicoidal surface at a mean point in the tooth length. The line 234 (Fig. 27) denotes the line of centers of different cutting edges at one side of the cutter, and 235, 236 and 237, denote, respectively, the centers of the blade profiles for the blades which cut at the outer end, a mean point, and the inner end of a tooth space, respectively. The cutter may have its blades arranged part way only around its periphery with a gap between the last and the first blades for indexing. It can be fed across the face of the blank in one direction to chamfer both sides of a tooth space, and may be returned to initial position while the indexing is being effected.

Instead of producing the chamfer in a separate operation from the side-cutting operation, one side of a tooth space may be cut and the opposite side chamfered simultaneously. Here a cutter will be employed that has cutting blades such as shown at 240 (Fig. 28). The blade 240 has a straight side 241 for cutting one side of the tooth space and a curved side cutting edge 242 for chamfering the opposite side of the tooth space.

The cutter may again be of the general type illustrated in Figs. 15 to 17 inclusive, having two separate groups of cutting blades separated by peripheral gaps. The blades of the first group may be shaped as shown in Fig. 28 to cut the sides 216 of the clutch teeth and chamfer the opposite sides 218 of the teeth. The blades of the second group of blades of the cutter will then be shaped to cut the sides 218 of the clutch teeth and chamfer the sides 216 thereof.

The cutting and chamfering of the clutch teeth may be effected with or without lengthwise feed of the cutter, preferably without lengthwise feed. In this case, the procedure may be similar to that described with reference to the process illustrated in Figs. 13 and 14 except that the cutter will be so disposed that its axis will be at a greater distance from the clutch axis than is shown in Fig. 13. This results in cutting tooth spaces having somewhat inclined tooth bottoms. In this manner, the chamfered surfaces can be correctly formed. The plane side surfaces of the clutch teeth may also be correctly formed in this position because plane side surfaces are perpendicular to the cutter axis and independent of the location of the cutter axis radially of the clutch. With the type of cutter illustrated in Fig. 28, therefore, a very efficient method of producing a releasable face clutch member is provided, whereby both sides of a tooth space can be cut and chamfered in a single revolution of the cutter.

Releasable face clutches of the type described are superior to the clash-type clutches conventionally employed, where one clutch member has external teeth and the mating clutch member has internal teeth. Clutch members constructed according to the present invention may be made quite rapidly and both members may be cut alike and in identical cutting operations. Moreover, the chamfer can be produced on the teeth simultaneously with the cutting thereof, whereas with the conventional external and internal type of clutch, the engaging ends of the teeth have to be chamfered in a separate operation from the tooth cutting operation. Further than this, for clutches for use in the aeroplane field, the releasable face clutch of the present invention has the advantage of reduced weight as compared with an external-internal type of clutch.

Figs. 29 to 32 inclusive demonstrate how the desired helicoidal surface of varying lead may be approximated by a surface of revolution and these figures hence show how a rotary cutter, such as described just above, may be used to produce the desired type of chamfer on the clutch teeth in a depthwise feed operation. These figures also demonstrate how a load-releasing type of clutch can be cut with side tooth surfaces that are surfaces of revolution but which approximate helicoidal surfaces of varying lead to accomplish the purposes of the present invention. In fact, it is specifically with reference to the latter type of clutch that these figures deal. These figures demonstrate that a varying lead helicoidal side surface of a tooth can be approximated by a surface of revolution, and it is obvious therefore that they demonstrate also that a chamfered helicoidal portion of varying lead can also be approximated by a surface of revolution.

Let us consider a mean point 245 (Fig. 30) in the length of a side surface 246 of a clutch member 248 whose side surfaces 246 are radial of the clutch axis 250. The tangent to a helix at point 245 appears as a line 251 perpendicular to the radial line 252 and intersecting the plane 253 central of the tooth space in a point 254. The inclination of this tangent to the drawing plane of Fig. 30 is given or known from the given instantaneous lead of the helicoidal surface. It equals the lead angle of the helicoidal surface at point 245. We can therefore determine the position of the point 254 axially of the clutch, and locate point 254 in Fig. 29. This point and the pitch cone apex 255 of the clutch are points in the plane tangent to the helicoidal surface at point 245, and their connecting line 255—254 (Fig. 29) is the line of intersection of said tangential plane with the central plane 253, which is the plane of the drawing of Fig. 29. A normal to the helicoidal surface at point 245 appears, therefore, as a line 256 perpendicular to the line 255—254 in Fig. 29.

By projecting point 245 to the line 255—254, point 245' is obtained. Then a line 258 is drawn through the point 245' perpendicular to the clutch axis 250. If we repeat the procedure given for mean point 245 at other points 260 and 261 at the ends, respectively, of the tooth surface, which all have the same axial position, we find that points 260' and 261', which correspond to point 245', all have the same axial position and that these latter points all lie on the line 258. This enables us quickly to draw the tooth normal at any point in the line 252, such as at the point 260.

To determine point 260' on line 258, draw line 260—260' parallel to the clutch axis 250, and draw a normal 262 through point 260 perpendicular to the line 255—260'. If the normals 256, 262, and 264 at the points 245, 260 and 261, respectively, are determined as above, or individually, as described for the point 245, we find that in the view of Fig. 29 they intersect substantially in a point 265. More exactly, they envelop a curve whose mean point is at 265. In any case, the desired shape of the surface area along the line 252 can be closely approximated by a surface of revolution whose axis is at 265 and is perpendicular to the plane of the drawing of Fig. 29, and whose normals seemingly intersect at 265. This surface can be described or swept over by rotating the straight line 252 about the axis 265. Its nature is well known. It is a hyperboloid of revolution whose profile in an axial section is a hyperbola 266, (Fig. 32). It may be approximated in the region used by a circle 267 whose center is at 268.

To obtain the localized bearing and relief at the ends of the teeth, the radius of this circle may be made somewhat smaller than the curvature radius of the hyperbola at its mean point.

The different inclinations of the profile tangents at different points along the length of the tooth surface are clearly shown in Fig. 31 which shows fragmentarily a load-releasing clutch member made according to this invention. 270 and 271, respectively, denote the tangents to a tooth surface 272 of this clutch member at the inner and outer ends of the tooth surface, respectively.

In the cutting of a tooth space of the clutch member 248, the rotating cutter is preferably fed depthwise into the work until the cutter axis reaches position 265 where the feed movement stops. The final shape of the tooth sides is produced in this position by the finishing blade or blades of the cutter. The depthwise feed motion may be in the direction of the clutch axis 250.

The clutch, whose members have helicoidal side tooth surfaces of varying lead as described, may be used as a load releasing clutch. The action of such a clutch is shown in Fig. 33. The two members of the clutch are shown in full lines at 248 and 275 in completely engaged position. A further position of the clutch member 275 when nearly disengaged is shown in dotted lines at 275'.

On this type of clutch, the pressure angle or inclination of the tooth profiles increases in the direction of tooth height. At the tops of the teeth, namely, in the dotted line position shown at 275', the higher pressure angle portions of the tooth surfaces are in engagement with the result that the separating force is greater for a given transmitted torque. This is often desirable where the clutch is to be thrown out of engagement when an excessive load comes on.

If the profiles of the clutch become more curved than is desirable, as is likely when the number of teeth in the clutch members is large, then the two sides of a tooth space of the clutch may be cut successively. The opposite sides of a tooth space of the clutch are then cut successively by the method illustrated in Figs. 13 and 14 where the blank is indexed half a pitch for each half revolution of the cutter and each side surface of the clutch lies in the cutter plane during the cutting of that side surface.

The same procedure, as has been described for cutting the sides of the teeth of the load releasing clutch member 248, may be applied in cutting a chamfer at the tops of the teeth of an adjustable clutch member. Such a member may have side tooth surfaces which are planes parallel to the clutch axis, like the clutch members shown in Figs. 12 to 14 inclusive. A clutch of this type is shown in Fig. 34. The members of this clutch are denoted at 280 and 281, respectively. Each clutch member has teeth 282 whose opposite sides 283 and 284 are planes and parallel to the clutch axis, and each clutch member has the upper ends of its teeth chamfered to form helicoidal surfaces 285 and 286 of varying lead. One side 284 of the tooth space and the chamfered portion 286 at the opposite side of the tooth space may be cut simultaneously with one group of the blades of a cutter such as shown in Figs. 15, 16 and 28 and after the work has been indexed half a pitch, the opposite side 283 of the tooth space and the chamfered portion 285 may be cut simultaneously by the other group of blades of the cutter. Since the cutter has no lengthwise feed along the tooth space, the chamfered portions 285 and 286 of the tooth surfaces are surfaces of revolution approximating helicoids of varying lead, and the plane sides 283 and 284 of the tooth spaces are, of course, also surfaces of revolution.

The chamfer may, of course, be applied in a separate operation. In this case constant tooth depth may be attained.

In a further modification of the present invention, load-releasing clutches having helical tooth surfaces of constant lead may be produced. Such clutches may be provided with straight radial teeth, which taper in width and height from end to end as illustrated in Figs. 35 and 36. Here a clutch member 291 is shown which has radial teeth 292 whose sides are helical surfaces of constant lead. In any plane 293 perpendicular to the axis 294 of this clutch member, the sides of the teeth will appear as straight lines 295 and 296 intersecting the clutch axis. The side surfaces of the teeth 292 can be described by moving the straight lines 295 and 296 about and in the direction of the clutch axis 294 at a constant rate with a constant ratio between the rotary and translatory movements. All points in the line 295 or 296 will describe, therefore, helices of the same lead which appear as the profile curves of the clutch. The profile curves are practically straight, but have inclinations or pressure angles which vary along the length of the teeth. The pressure angles or inclination increase with increase in distance from the clutch axis.

I have found that such clutch members can be produced with disc type cutters having cutting edges of convex profile. A cutter of the required type is shown diagrammatically in section at 300 in Fig. 37. This cutter has blades 301 whose opposite side cutting edges are of convex shape, being curved along circular arcs 302 or along any other suitable curves. Corresponding side cutting edges of successive blades of this cutter have varying inclinations to produce the required variation in pressure angle along the length of the clutch teeth from one end thereof to the other. Both sides of a tooth space are simultaneously cut in a feed motion lengthwise of the tooth space.

Another way of cutting a clutch member of the described type is illustrated diagrammatically in Figs. 38 to 42 inclusive. Here one side of a tooth space of the clutch is cut in a half a revolution of the cutter and the opposite side of the tooth space is cut in the remaining half revolution.

A cutter of the general type shown in Figs. 15 and 16 is employed. This cutter has the cutting blades of each group of its blades so constructed that the corresponding sides of successive blades have varying inclination to the axis of the cutter.

In the cutting of a tooth space of the cutter, the cutter is fed in the direction of the pitch plane 310 of the clutch member 311 so that the axis of the cutter will move from position 312 to position 312'. A mean position of the cutter axis is denoted at 312'', and the position of the tip surface of the cutter for this mean position is denoted as shown in dotted lines at 313. In the cutting of one side surface 314 of a tooth space, the cutter will move along a line 315 radial of the clutch axis 316, and in the cutting of the opposite side 317 of the tooth space, the cutter will move along a radial line 318. The work is indexed half a pitch for each half revolution of the cutter when a gap in the cutter is abreast of the work.

Figs. 40 to 42 inclusive show the shapes of the blades used for cutting the outer end, center and the inner end, respectively, of a tooth surface at one side of a tooth space. The opposite side of the tooth space is cut in an exactly symmetrical manner. The profiles of the cutting blades are circular arcs 320 having a radius 321.

For cutting at the outer end of the clutch tooth, the center of the circular arc will be at 322 so that the blade profile 323 will have greatest inclination to a plane 324 containing the clutch axis. The center of the cutting edge 325 of the blade 326 for cutting at the center of the tooth length is at 322' displaced from position 322. The blade 327, which cuts at the inner end of the tooth space, has the center of curvature of its side cutting edge 329 still further displaced to a position 322'' so that the inclination of the profile of the tooth space to the plane 324 will be still further reduced. Thus while the cutting edges 328 and 329 have the same radius of curvature 321 as the cutting edge 323, their inclination is progressively reduced so as to cut, as desired, a tooth surface having side profiles that progressively decrease in inclination from one end to the other. This change in inclination is, of course, gradual from one end of the tooth space to the other.

When one side of a tooth space has been cut, the cutter is rapidly returned to starting position and the clutch is indexed through half a pitch. Then the cutter is again fed across the face of the blank to cut the opposite side of the tooth space. Then the cutter is again returned to starting position while the work is being indexed through half the pitch. There are therefore two identical feed strokes and two indexes per cutter revolution.

Figs. 43 to 45 inclusive illustrate diagrammatically a modified form of cutter which will produce a still better approximation of the desired helical tooth shape. Here three blades 330, 331 and 332 are shown which are adapted to cut, respectively, at the outer end, the center, and the inner end of one side of a tooth space. The cutting profile in the case of these blades is no longer a circular arc, but a line 334 of changing curvature, being most curved at the points of least inclination, that is, its radius of curvature is reduced with reduced inclination of the sides of the clutch teeth. The radius of curvature 336 of the side-cutting edge 335 of the blade 330, which cuts at the large end of the gear tooth, is greater than the radius of curvature 337 of the side-cutting edge 338 of the blade 331 which cuts at the center of the gear tooth, and this in turn is larger than the radius of curvature 339 of the side cutting edge 340 of the blade 332 which cuts at the inner end of the tooth space.

A satisfactory curve of this character is an involute of a circle whose center is at 342 in Fig. 43. Different positions of the involute curve are obtained by moving the curve through a point 343 without turning it. Positions 342, 342' and 342'' of the center of the circle 345 are then obtained. It is to be noted that the line 346 connecting the center 342 with the starting point 347 of the involute has a bodily displacement so that the lines 342—347, 342'—347 and 342''—347 are all parallel. The curve 334 also has a bodily translation so that the center 342 describes a curve 348 (Fig. 44) which is identical with the curve 334.

Figs. 46 to 54 show a modified form of clutch and method of cutting same. Here one clutch member 350 has tooth spaces 352 of uniform width from end to end, and teeth 353 which taper in width from end to end, while the other clutch member 351 has teeth 354 of uniform width from end to end and tooth spaces 355 which taper in width from end to end. Preferably the teeth and tooth spaces of both members are made of uniform depth from end to end. The clutch member 350 readily lends itself to production in an operation where both sides of a tooth space are cut simultaneously, while the clutch member 351 can have both sides of its teeth cut simultaneously.

For producing the two members 350 and 351 of the clutch, in operations where two tooth sides are to be cut simultaneously, a pair of male and female cutters are required. The structure of the male cutter for cutting the clutch member 350 is illustrated diagrammatically in Figs. 49 to 51 inclusive. 360 denotes a blade which is to cut at the large end of a tooth space 352. 361 is a blade which cuts midway the length of the tooth space, and 362 is the blade which cuts at the inner end of the tooth space. It is to be noted that the inclination of the corresponding side cutting edges 363, 364 and 365 of the blades to the mean cutting plane 366 decreases from the blade 360, which is adapted to cut at the outer end of the tooth space, to the blade 362 which cuts at the inner end of the tooth space, and that, similarly, the inclination of the opposite side cutting edges 367, 368, and 369 decreases from the blade, which is adapted to cut at the outer end of the tooth space, to the blade which is adapted to cut at the inner end of the space.

The cutter for producing the clutch member 351 has its cutting blades arranged in pairs to straddle a tooth of the clutch member and cut opposite sides of the tooth simultaneously. 370 denotes the blade which is adapted to cut at the outer end of the teeth, 371 the blade which is adapted to cut midway of the tooth length, and 372 the blade which is adapted to cut at the inner end of the teeth. The opposite side-cutting edges of the blade 370 are denoted at 373 and 377, respectively. The opposite side-cutting edges of the blade 371 are denoted at 374 and 378, respectively, while the opposite side-cutting edges of the blade 372 are denoted at 375 and 379, respectively. It will be noted that the inclination of the corresponding side-cutting edges of the blades to the mean cutting plane 376 of the cutter decreases progressively from the blade which cuts at the outer end of the teeth to the blade which cuts at the inner end of the teeth. Preferably, at the common pitch line 390 of the clutch members, the inclinations of the side cutting edges 363 and 367, which cut at the outer ends of the tooth spaces of the clutch member 350, equals the inclination of the edges 373 and 377 of the blade 370 which cuts at the outer ends of the engaging sides of the teeth of the mating clutch member 371. Likewise, cutting edges 367, 368, 369 have, respectively, the same inclination at the pitch line as the cutting edges 377, 378 and 379, respectively, which cut corresponding points along the opposite mating tooth sides.

The opposite side cutting edges of both cutters are of convex profile shape. The profiles may be circular arcs, or they may be lines of varying curvature whose curvature radius increases from the bottom of the cutting profile to the outside thereof.

The side surfaces to be cut on the clutch members are helicoids of opposite hand and of constant lead whose generatrices 392, 393 and 394 and 395 in any plane perpendicular to the clutch axis 396 are straight lines extending longitudinally of the teeth but offset from the clutch axis.

For cutting either member of the pair, the required cutter is rotated on its axis 397 or 398 while a straight line feed movement is produced between the cutter and the work across the face of the work in time with the cutter rotation.

Depthwise feed may be employed to move the cutter into full depth, but when full depth position is reached, the lengthwise feed movement will preferably be in the direction of the pitch line 390.

In Fig. 47, the position, at a mean point in the longitudinal feed movement, of the tip cutting surface of the cutter, which is used for cutting the clutch member 351, is denoted at 399, while 398' denotes the position of the axis of the cutter for this mean position. As either cutter is fed along the pitch line of the clutch blank, the varying inclination of the cutting profiles continuously matches the known varying inclination of the helical tooth sides which it is desired to approximate. Contact between the cutting edges of the cutter and the tooth surface being produced on the work is along a line extending diagonally across the tooth surfaces, ordinarily more in a longitudinal direction than in the direction of the tooth profile. This line can be determined mathematically by the requirement that the tooth normals at all points in the line must pass through the instantaneous axis of relative motion. The instantaneous axis depends on the rate of feed as compared with the cutter rotation and is parallel to and not far from the cutter axis.

On account of the inclination of the line of instantaneous contact, the cutting profiles and the tooth profiles do not fully match one another in an axial plane of the cutter, but they do contact with one another at the pitch point. While the tooth profile of the helicoid is substantially straight, the cutting profile must be convex. Its curvature can be determined mathematically with the directions given. It can also be determined experimentally by first making the helical clutch surface of constant lead, for instance by the method illustrated in Fig. 23, and then using that surface to produce the required cutting edge on a dummy blade of soft material which is rotated and fed across the face of the blank at the same rate as the cutter which is to be used to cut the clutch members.

While several different embodiments of the invention have been described, it will be understood that it is capable of further modification, and this application is intended to cover any adaptations, uses, or modifications of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting the tooth surfaces of a face clutch member which comprises employing a rotary disc cutter having a plurality of cutting blades arranged in two groups around its periphery with a gap between the last and first blades of each group, the two groups containing blades which are shaped to cut opposite sides of the tooth spaces of the work, rotating said cutter in engagement with the work and effecting a relative feed movement between the cutter and the work in time with the cutter rotation while each group of blades is in operation, and indexing the work half a pitch each time after a group of blades has taken its cut.

2. The method of cutting the tooth surfaces of a face clutch member which comprises employing a rotary disc cutter having a plurality of cutting blades arranged in two groups around its periphery with a gap between the last and first blades of each group, each group comprising a plurality of roughing blades followed by one or more finishing blades, the finishing blades of the two groups being shaped to cut opposite side tooth surfaces of the work, respectively, rotating said cutter in engagement with the work, effecting a relative feed movement between the cutter and work in time with the cutter rotation while each group of blades is in operation, withdrawing the cutter from engagement with the work after each group of blades has taken its cut, and indexing the work half a pitch on each withdrawal while a gap in the cutter is abreast of the work.

3. The method of cutting the tooth surfaces of a face clutch member which comprises employing a rotary disc cutter having a plurality of cutting blades arranged in two groups around its periphery with a gap between the last and first blades of each group, each group having a plurality of roughing blades followed by one or more finishing blades, the finishing blades of the two groups being shaped to cut opposite side tooth surfaces of the work, respectively, and rotating said cutter in engagement with the work, effecting a depthwise feed movement between the cutter and work in time with the cutter rotation while each group of blades is cutting, and withdrawing the cutter from the work while each gap in the cutter is abreast of the work, and indexing the work half a pitch during each withdrawal.

4. The method of cutting a face clutch member which comprises employing a rotary disc cutter having a plurality of cutting blades arranged in two groups around its periphery with a gap between the last and first blades of each group, the blades of the two groups being shaped to cut opposite side tooth surfaces of the work, respectively, and effecting a relative lengthwise feed movement between the cutter and work in time with the cutter rotation in one direction while each group of blades is cutting and in the opposite direction while each gap is abreast of the work, and indexing the work half a pitch each time a gap in the cutter is abreast of the work.

5. The method of cutting the tooth surfaces of a face clutch member which comprises employing a rotary disc cutter that has a plurality of peripherally arranged cutting blades which are disposed in two groups with a gap between the last blade of each group and the first blade of the other group, the blades of each group being of progressively varying point-width, and rotating said cutter in engagement with the work while producing a relative lengthwise feed movement between the cutter and work in time with the rotation of the cutter and in a direction radial of the clutch axis so that different blades of the cutter cut at different points along the length of a tooth surface during a revolution of the cutter, and indexing the work half a pitch each time a gap in the cutter is abreast of the work.

6. The method of cutting the tooth surfaces of a face clutch member which comprises employing a rotary disc cutter that has a plurality of peripherally arranged cutting blades disposed in two groups with a gap between the last blade of each group and the first blade of the other group, the blades of each group being of progressively varying point-width, and rotating said cutter in engagement with the work while producing a simultaneous relative depthwise and lengthwise feed movement between the cutter and work in time with the cutter rotation until the cutter reaches full depth position, and then effecting relative lengthwise feed movement between the cutter and the work also in time with the cutter rotation so that different blades of the cutter cut at progressively different points along the length of a tooth surface of the work from one end thereof to the other as the cutter rotates in engagement with the work, and indexing the work half a pitch each time a gap in the cutter is abreast of the work.

7. The method of cutting tooth surfaces of a face clutch member which comprises employing a rotary disc cutter that has a plurality of blades arranged in two groups around its axis with a gap between the last and first blades of each group, the blades having sides perpendicular to the cutter axis and tip cutting edges concentric of said axis, each group of blades having a plurality of roughing blades followed by one or more finishing blades, the finishing blades of the two groups being shaped to cut opposite tooth sides of the work, respectively, rotating said cutter in engagement with the work, feeding the cutter depthwise into the work while roughing blades of each group are cutting until full depth position is reached, allowing the cutter to remain at full depth while the finishing blades of each group are cutting, and withdrawing the cutter from engagement with the work while each gap in the cutter is abreast of the work, and indexing the work through half a pitch during each withdrawal.

8. The method of producing an approximately helicoidal tooth surface of varying lead on a side of a tooth of a toothed face clutch member, which comprises employing a rotary disc cutter that has a plurality of cutting blades of curved profile shape and progressively varying point-width, and that has the centers of curvature of corresponding side profiles of successive blades progressively displaced from one another, positioning said cutter so that its axis is disposed at a greater radial distance from the clutch axis than the mean radius of the clutch, rotating said cutter in engagement with the work while effecting a relative depthwise feed motion between the cutter and the work in time with the cutter rotation while maintaining the cutter axis at said greater radial distance, and periodically indexing the work.

9. The method of producing a face clutch member which comprises employing a rotary disc cutter having a plurality of cutting blades arranged in two groups around its periphery with a gap between the last and first blades of each group, the blades of one group being adapted to cut one side of a tooth space of the work and chamfer the opposite side of said tooth space at the top thereof, and the blades of the other group being adapted to cut and chamfer the sides of the tooth space opposite to those cut and chamfered, respectively, by the first group of blades, and rotating said cutter in engagement with the work, producing a relative feed movement between the cutter and work while each group of blades is cutting, withdrawing the cutter from engagement with the work each time a gap in the cutter is abreast of the work, and indexing the work through half a pitch on each withdrawal.

10. A rotary disc cutter having a plurality of radially disposed cutting blades arranged in two groups around the periphery of the cutter with a gap between the last blade of each group and the first blade of the other group, the blades of the two groups lying, respectively, at opposite sides of a plane of rotation perpendicular to the axis of the cutter.

11. A rotary disc cutter having a plurality of radially disposed cutting blades arranged in two groups around the periphery of the cutter with a gap between the last blade of each group and the first blade of the other group, each group of blades comprising a plurality of roughing blades and one or more finishing blades, the two groups of blades lying, respectively, at opposite sides of a plane of rotation perpendicular to the axis of the cutter, and the finishing blades of the two groups having opposite side-cutting edges lying in said plane.

12. A rotary disc cutter having a plurality of radially disposed cutting blades arranged in two groups around the periphery of the cutter with a gap between the last blade of each group and the first blade of the other group, the blades of one group having cutting edges for cutting one side and chamfering the opposite side of a tooth space, and the blades of the other group having cutting edges for cutting and chamfering, respectively, the sides of the tooth space opposite to those cut and chamfered by the first group of blades.

13. A rotary disc cutter having a plurality of radially disposed cutting blades arranged in two groups around the periphery of the cutter with a gap between the last blade of each group and the first blade of the other group, the blades of one group having cutting edges for cutting one side and chamfering the opposite side of a tooth space, and the blades of the other group having cutting edges for cutting and chamfering, respectively, the sides of the tooth space opposite those cut and chamfered, respectively, by the first group of blades, the cutting edges for cutting a given side of the tooth space having the same inclination to the axis of the cutter, and the cutting edges for chamfering a given side of the tooth space having progressively varying inclination to the axis of the cutter.

14. A rotary disc cutter having a plurality of radially disposed cutting blades arranged in two groups with a gap between the last blade of each group and the first blade of the other group, the blades of each group having straight side-cutting edges of constant inclination with respect to a plane of rotation perpendicular to the axis of the cutter and having tip cutting edges of varying point-width arranged at a uniform distance from the cutter axis, the side-cutting edges at the same side of the blades of each group having varying positions along said axis, and the blades of the two groups lying, respectively, at opposite sides of a plane of rotation perpendicular to the axis of the cutter.

15. A rotary disc cutter having a plurality of radially disposed cutting blades arranged in two groups around its periphery with a gap between the last blade of each group and the first blade of the other group, the blades of each group having curved side cutting edges, successive side cutting edges at the same side of the blades of each group having progressively varying inclination to a plane of rotation perpendicular to the cutter axis, the curvature of successive side cutting edges of each group increasing with decreasing inclination of the side-cutting edges to said plane.

16. The method of cutting a toothed face clutch member which comprises employing a rotary disc cutter having a plurality of cutting blades arranged in two groups around its periphery with a gap between the last blade of each group and the first blade of the other group, each group having a plurality of roughing blades followed by one or more finishing blades, the blades of the two groups being sharpened to cut opposite tooth sides, respectively, the finish cutting edges of the finishing blades of the two groups being of straight profile shape and lying in a common plane perpendicular to the axis of the cutter and the roughing blades of the two groups being of progressively varying point width and being offset at opposite sides of said plane, respectively, rotating said cutter in engagement with the work while effecting a relative depthwise feed movement between the cutter and work in time with the cutter rotation to cut one side of a tooth space of the work, then withdrawing the cutter from engagement with the work and indexing the work through half a pitch while one of the gaps in the cutter is abreast of the work, and repeating the cycle of feed, withdrawal and indexing until the work is completed.

17. The method of cutting a toothed face clutch member which comprises employing a rotary disc cutter having a plurality of cutting blades arranged in two groups around its periphery with a gap between the last blade of each group and the first blade of the other group, each group having a plurality of roughing blades followed by one or more finishing blades, the blades of the two groups being sharpened to cut opposite tooth sides, respectively, the finishing blades of the two groups being of curved profile shape and the roughing blades of each group being of progressively varying point width, positioning said cutter so that its axis is disposed at a greater distance from the clutch axis than the mean radius of the clutch, and rotating said cutter in engagement with the work while effecting a relative depthwise feed movement between the cutter and work in time with the cutter rotation to cut one side of a tooth space of the work, then withdrawing the cutter from engagement with the work and indexing the work half a pitch while one of the gaps in the cutter is abreast of the work, and repeating the cycle of feed, withdrawal and indexing until the work is completed.

18. The method of cutting a toothed face clutch member which comprises employing a rotary disc cutter having a plurality of cutting blades arranged in two groups around its periphery with a gap between the last blade of each group and the first blade of the other group, each group having a plurality of blades of progressively varying point width, and rotating said cutter in engagement with the work while effecting a relative lengthwise feed movement between the cutter and work in time with the cutter rotation, then withdrawing the cutter from engagement with the work and indexing the work half a pitch while one of the gaps in the cutter is abreast of the work, and repeating the cycle of feed, withdrawal, and indexing until the work is completed.

19. The method of producing a toothed face clutch member which comprises employing a rotary disc cutter having a plurality of cutting blades arranged in two groups around its periphery with a gap between the last blade of each group and the first blade of the other, corresponding side cutting edges of successive blades of each group having progressively varying inclination to a plane of rotation perpendicular to the axis of the cutter, and rotating the cutter in engagement with the work while effecting a relative feed movement between the cutter and work longitudinally of a tooth of the work in time with the cutter rotation, and periodically withdrawing the cutter from engagement with the work and indexing the work half a pitch during withdrawal and while a gap in the cutter is abreast of the work.

20. The method of producing a toothed face clutch member which comprises employing a rotary disc cutter having a plurality of cutting blades arranged in two groups around its periphery with a gap between the last blade of each group and the first blade of the other group, the blades of each group being of progressively varying point width and having straight side cutting edges at one side for cutting one side of a tooth space of the work, and curved side cutting edges at the opposite side for chamfering the opposite side of the tooth space, the blades of the two groups having side cutting edges at opposite sides, respectively, and chamfering edges at opposite sides, respectively, whereby they cut and chamfer opposite sides of a tooth space, respectively, and rotating said cutter in engagement with the work while effecting a relative feed movement between the cutter and work in time with the cutter rotation, withdrawing the cutter from engagement with the work after each group has taken its cut, and indexing the work while the cutter is withdrawn and while a gap in the cutter is abreast of the work.

21. The method of producing a toothed face clutch member which comprises employing a rotary disc cutter having a plurality of cutting blades arranged in two groups around its periphery with a gap between the last blade of each group and the first blade of the other group, the blades of each group being of progressively varying point width and having straight side cutting edges at one side for cutting one side of a tooth space of the work, and curved side cutting edges at the opposite side for chamfering the opposite side of the tooth space, the blades of the two groups having side cutting edges at opposite sides, respectively, and chamfering edges at opposite sides, respectively, whereby they cut and chamfer opposite sides of a tooth space, respectively, and positioning said cutter so that its axis is at a greater distance from the clutch axis than the mean radius of the clutch, and rotating said cutter in engagement with the work while effecting a relative depthwise feed movement between the cutter and work in time with the cutter rotation, and withdrawing the cutter from engagement with the work periodically and indexing the work while the cutter is withdrawn and the gap in the cutter is abreast of the work.

22. The method of producing a toothed face clutch member which comprises employing a rotary disc cutter having a plurality of cutting blades arranged in two groups around its periphery with a gap between the last blade of each group and the first blade of the other group, the blades of each group being of progressively varying point width and having straight side cutting edges at one side for cutting one side of a tooth space of the work and curved side cutting edges at the opposite side for chamfering the opposite side of the tooth space, the curved side-cutting edges being of progressively varying inclination to a plane of rotation perpendicular to the axis of the cutter, the blades of the two groups having side cutting edges at opposite sides, respectively, and chamfering edges at opposite sides, respectively, whereby they cut and chamfer opposite sides of a tooth space, respectively, rotating said cutter in engagement with the work while effecting relative feed movement between the cutter and work longitudinally of a tooth space of the work in time with the cutter rotation, withdrawing the cutter from the work periodically, and indexing the work while the cutter is withdrawn and while a gap in the cutter is abreast of the work.

23. A rotary disc cutter having a plurality of cutting blades arranged in two groups around its periphery with a gap between the last blade of each group and the first blade of the other group, the blades of each group being of progressively varying point width, the blades of one group having side cutting edges of straight profile for cutting one side of a tooth space and side cutting edges of curved profile for chamfering the opposite side of the tooth space, and the blades of the other group having straight side cutting edges and curved chamfering edges for cutting and chamfering, respectively, the opposite sides of the tooth space to those cut and chamfered by the first group of blades.

24. A rotary disc cutter having a plurality of cutting blades arranged in two groups around its periphery with a gap between the last blade of each group and the first blade of the other group, the blades of each group being of progressively varying point width, the blades of one group having side cutting edges of straight profile for cutting one side of a tooth space and side cutting edges of curved profile for chamfering the opposite side of the tooth space, and the blades of the other group having straight side cutting edges and curved chamfering edges for cutting and chamfering, respectively, the opposite sides of the tooth space to those cut and chamfered by the first group of blades, corresponding straight side cutting edges of each group being of the same inclination to a plane of rotation perpendicular to the axis of the cutter, and corresponding curved side cutting edges of each group being of progressively varying inclination to said plane.

25. A rotary disc cutter having a plurality of cutting blades arranged in two groups around its periphery with a gap between the last blade of each group and the first blade of the other group, the blades of each group being of progressively varying point-width, the blades of each group having side cutting edges of straight profile for cutting one side of a tooth and side cutting edges of curved profile shape for chamfering the opposite side of a tooth, the side cutting edges of the two groups being adapted to cut and chamfer opposite sides of the teeth, respectively, each group of blades comprising a plurality of roughing blades and one or more finishing blades, the straight profiled cutting edges of the finishing blades of the two groups lying in a common plane perpendicular to the axis of the cutter.

26. A rotary disc cutter having a plurality of radially disposed cutting blades arranged around its periphery in two groups with a gap between the last blade of each group and the first blade of the other group, the blades of the two groups lying, respectively, at opposite sides of a plane of rotation perpendicular to the axis of the cutter, successive blades of each group having side-cutting edges at the same side which are of curved profile shape and which are differently inclined to a plane of rotation perpendicular to the axis of the cutter.

27. The method of cutting a toothed face clutch member which comprises employing a rotary disc cutter having its blades arranged around its periphery in two groups with a gap between the last blade of each group and the first blade of the other group, the blades of each group having side-cutting edges of curved profile shape, the side-cutting edges at the same side of the blades in either group having progressively varying inclination to a plane perpendicular to the cutter axis, and rotating said cutter in engagement with the work while effecting a relative lengthwise feed movement between the cutter and the work in time with the cutter rotation and in one direction while a group of blades are cutting and in the opposite direction while the gap in the cutter is abreast of the work, and indexing the work through half a pitch each time that a gap in the cutter is abreast of the work.

28. The method of cutting a toothed face clutch member which comprises employing a rotary disc cutter having its blades arranged around its periphery in two groups with a gap between the last blade of each group and the first blade of the other group, the blades of each group having side-cutting edges of uniform circular arcuate profile shape but the cutting edges at the same side of successive blades of either group having progressively varying inclination to a plane of rotation perpendicular to the axis of the cutter, the side-cutting edges which cut at the outer ends of the tooth spaces of the work having the greatest inclination to said plane, and rotating said cutter in engagement with the work while effecting a relative lengthwise feed movement between the cutter and the work in time with the cutter rotation and in one direction while a group of blades is cutting and in the opposite direction while the gap in the cutter is abreast of the work, and indexing the work through half a pitch each time that a gap in the cutter is abreast of the work.

29. The method of cutting a toothed face clutch member which comprises employing a rotary disc cutter having its blades arranged around its periphery in two groups with a gap between the last blade of each group and the first blade of the other group, the successive blades of each group having side-cutting edges which for the same side are of progressively varying profile shape, and rotating said cutter in engagement with the work while effecting a relative lengthwise feed movement between the cutter and the work in time with the cutter rotation and in one direction while a group of blades is cutting and in the opposite direction while a gap in the cutter is abreast of the work, and indexing the work through half a pitch each time a gap in the cutter is abreast of the work.

30. The method of cutting a toothed face clutch member which comprises employing a rotary disc cutter having its cutting blades arranged around its periphery in two groups with a gap between the last blade of each group and the first blade of the other group, each group having side-cutting edges at one side that are of straight profile shape and chamfering edges at the opposite side that are of curved profile shape, and rotating said cutter in engagement with the work while effecting a relative lengthwise feed movement between the cutter and work in time with the cutter rotation and in one direction while a group of blades is cutting and in the opposite direction while a gap in the cutter is abreast of the work, and indexing the work through half a pitch each time a gap in the cutter is abreast of the work.

31. The method of cutting a toothed face clutch member which comprises employing a rotary disc cutter having its cutting blades arranged around its periphery in two groups with a gap between the last blade of each group and the first blade of the other group, the blades of each group having side-cutting edges at one side that are of straight profile shape and chamfering edges at the opposite side that are of curved profile shape, the curved chamfering edges of successive blades of each group having progressively varying inclination to a plane perpendicular to the axis of the cutter, and rotating said cutter in engagement with the work while effecting a relative lengthwise feed movement between the cutter and the work in time with the cutter rotation and in one direction while a group of blades is cutting and in the opposite direction while a gap in the cutter is abreast of the work, and indexing the work through half a pitch each time that a gap in the cutter is abreast of the work.

ERNEST WILDHABER.